United States Patent Office 2,929,488
Patented Mar. 22, 1960

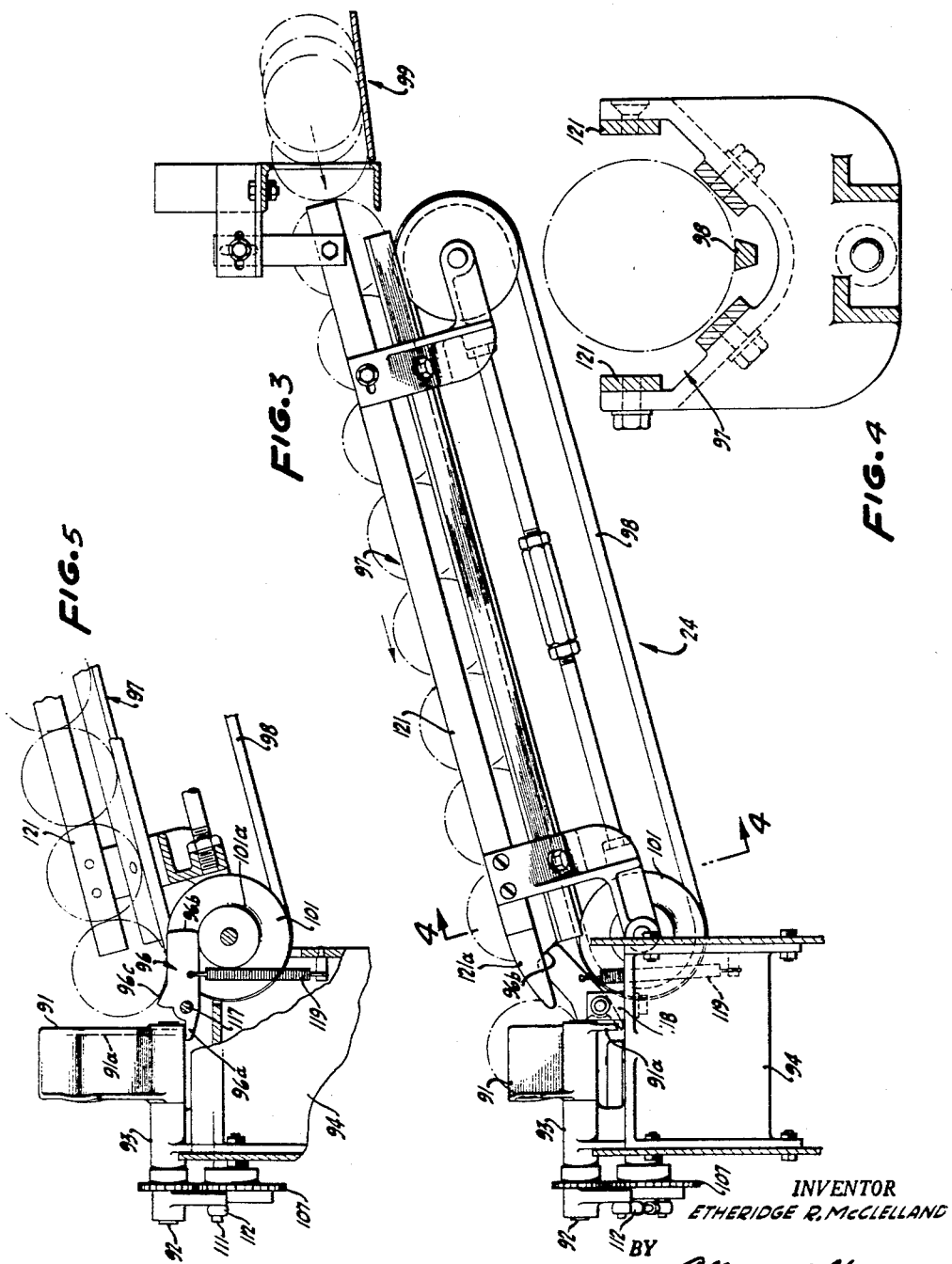

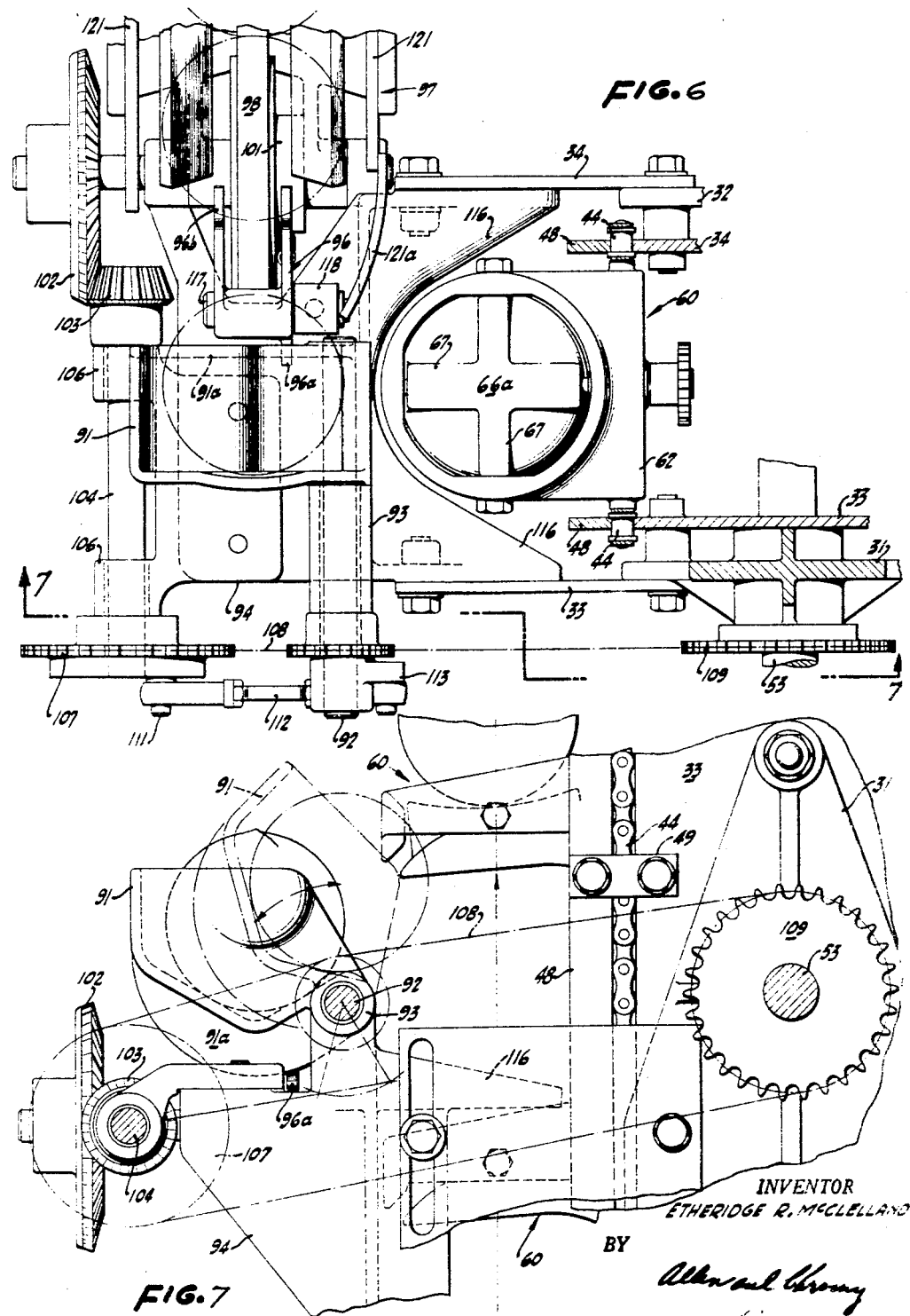

2,929,488

FRUIT FEED MECHANISM

Etheridge R. McClelland, San Pablo, Calif., assignor, by mesne assignments, to Filper Corporation, a corporation of California Original application August 12, 1952, Serial No. 303,913, now Patent No. 2,786,562, dated March 26, 1957. Divided and this application January 16, 1957, Serial No. 634,545

3 Claims. (Cl. 198—26)

This application is a division of my United States Letters Patent No. 2,786,562, dated March 26, 1957.

The present invention relates to apparatus and methods for the feeding of fruit articles to apparatus such as positioning or orientating apparatus, and is concerned more particularly with a feed apparatus of the above character which is adapted to supply one article to each pocket or receptacle as it passes by the feed mechanism.

It is the general object of the invention to provide improved feed mechanism for supplying fruit or vegetable articles to a conveyor.

Another object of the invention is to provide fruit feed means including a feed pocket related to a series of pocket structures, the feed pocket being mounted for movement in timed relation to the pocket structures to supply articles thereto.

Other objects and advantages of the invention will be apparent from the following description of a preferred embodiment thereof, as illustrated in the accompanying drawings, in which:

Figure 3 is a view of the feed mechanism taken as indicated by the line 3—3 in Figure 1;

Figure 4 is a fragmentary sectional view taken as indicated by the line 4—4 in Figure 3;

Figure 5 is a fragmentary sectional view similar to Figure 3;

Figure 6 is a horizontal sectional view taken as indicated by the line 6—6 in Figure 1; and Figure 7 is a sectional view taken as indicated by the line 3—3 in Figure 6.

Figure 1:
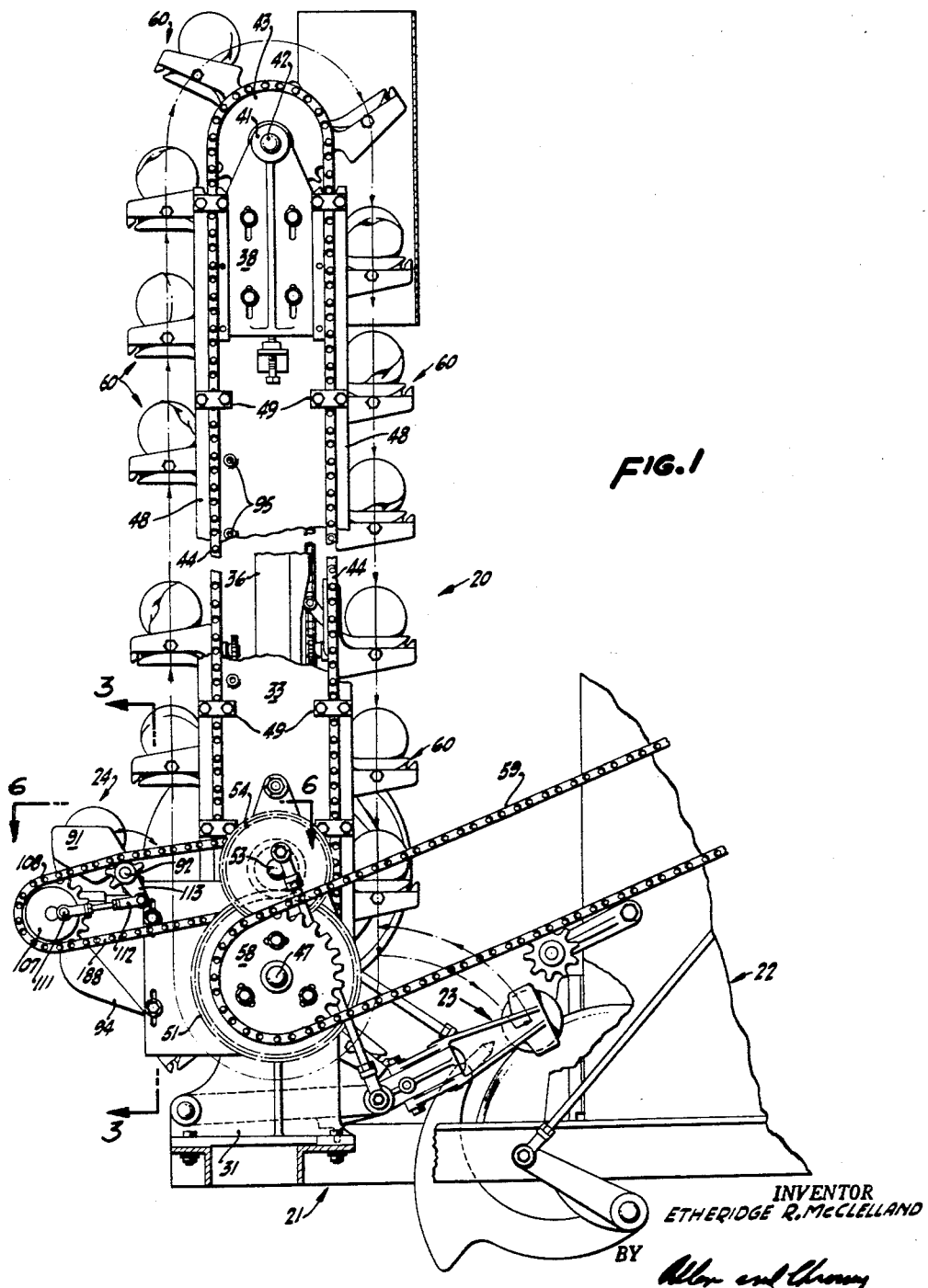
Figure 1 is a side elevational view of the orienting apparatus.
Figure 2:
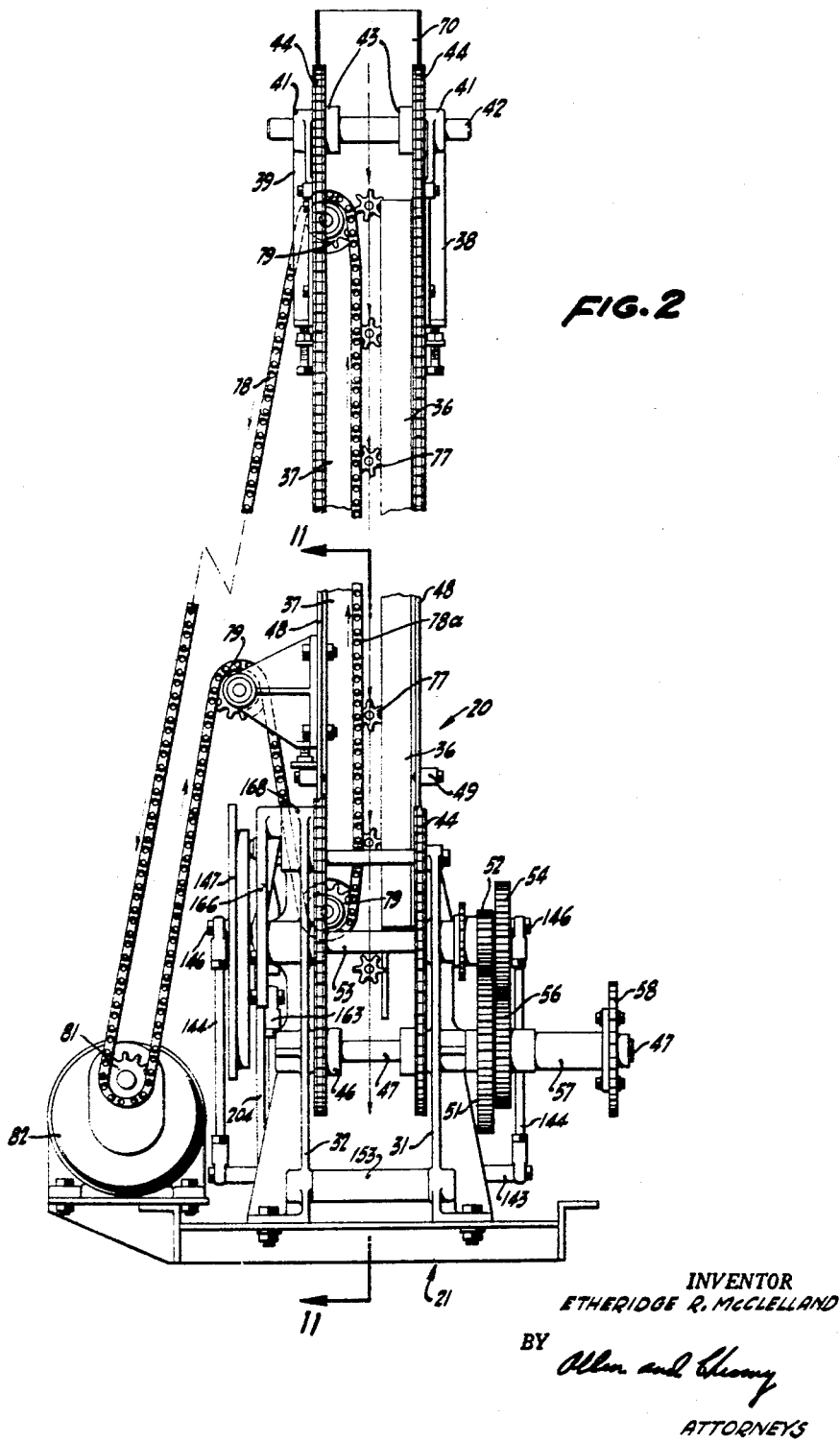
Figure 2 is an end elevational view with the orienting pockets omitted from the view.

Referring to Figures 1 and 2, the orienting and positioning apparatus employing the instant invention includes generally an orienting unit 20 supported in upright position on a framework 21 secured to a peach pitter 22 of conventional construction. A transfer mechanism 23 is provided for effecting transfer of oriented fruit from the orienting unit 20 to the pitter 22, and the orienter is fed by a feed unit 24, which supplies one peach at a time to the orienting unit 20.

The orienting unit 20 as stated above is of the upright type, and as shown herein, occupies no more floor space with reference to the peach pitter than that occupied by an operator manually feeding fruit to the pitter. The orienting unit 20 comprises generally an endless series of pocket structures carried vertically up through a path in which fruit may be fed thereto and then vertically downward through an orienting path, during which the orientation of the fruit is accomplished, first with respect to the location of the fruit by the stem indent in the fruit and thereafter location of the fruit with respect to its suture line, so that the fruit will be in proper position when it is transferred to the pitting unit to be split in a plane containing the natural division between the two pit halves of the fruit.

The orienting unit 20 (Figures 1, 2, 3 and 4) has a frame structure including two opposed upright base castings 31 and 32 secured to and above the framework 21, and respective side plates 33 and 34 secured adjacent the upper end of the respective base castings 31 and 32 and extending upwardly therefrom. Side plates 33 and 34 are provided with stifffening angles 36 and 37, respectively, which also serve as mounting brackets. At the upper end of the respective side plates 33 and 34, there are provided journal brackets 38 and 39 adjustably secured thereon and carrying at the upper end respective bosses 41 for the support shaft 42 of a pair of idle sprockets 43 for respective parallel chains 44 which extend downwardly and are trained about a pair of drive sprockets 46 mounted on a drive shaft 47 carried in suitable bosses of the base castings 31 and 32. To insure linear travel of the stretches of the chains 44 extending between the respective sprockets, guide strips 48 are secured in spaced relation at either edge of respective plates 33 and 34 by suitable brackets 49 spanning the portions of chain passing therethrough.

The drive for the shaft 47 is through a gear 51 (Figure 2) secured thereon which meshes with a smaller gear 52 on a second drive shaft 53 journaled in suitable bosses of the base castings 31 and 32, the shaft 53 also carries a gear 54 meshing with a gear 56 journaled on the drive shaft 47 and connected to a sleeve 57 carrying a drive sprocket 58. As seen in Figure 1, the drive sprocket 58 is connected by a chain drive 59 to suitable driving mechanism of the pitter 22.

The endless series of orienting devices or pocket structures carried by the respective chains 44 are operated to secure a rapid hunting and location of the stem indent of the fruit placing the indent in a desired position, and then to provide for automatic alignment of the suture line of the fruit in a given position, as disclosed and claimed in my co-pending application Serial No. 303,913, filed August 12, 1952.

As seen in Figure 1, the chains 44 carry a series of equally spaced apart pocket structures 60 which have fruit receiving pockets on either side thereof, one pocket being effective during the feed of the fruit to the orienting mechanism and the other pocket being effective during orientation of the fruit. As seen in Figure 6, each pocket structure 60 is provided on one side with a concave surface or feed pocket 66a having cross ribs 67 for supporting a fruit therein, after feeding of the fruit thereto during the upward travel of a pocket structure 60.

Referring to Figures 1, 3, 4, 5, 6 and 7, a feed mechanism 24 is provided for feeding a fruit into each pocket passing thereby and this feed mechanism is constructed so that it can be mounted at any desired elevation along the frame of the orienting apparatus in the linear travel of the pocket structure 60 upwardly along the left hand side of their path of travel as illustrated in Figure 1. The feed mechanism comprises a pocket 91 secured on a shaft 92 which is journaled in a boss 93 of a frame casting 94 bolted to the respective side castings 31 and 32. Other mounting stations 95 are provided on the side plates 33 and 34. The pocket 91 has adjacent thereto a fruit control pawl 96 and an inclined feed trough 97 having a V belt 98 forming the bottom thereof and fed from a suitable source of supply 99 such as a conventional "merry-go-round" conveyor structure. The V belt 98 is journaled on suitable pulleys 101, the shaft of one of which carries a bevel gear 102 (Figure 6) driven from a bevel pinion 103 on a stub shaft 104 journaled in suitable bosses 106 of the frame casting 94. The shaft 104 carries a sprocket 107 which is driven through a chain 108 from a sprocket 109 (Figures 2 and 6) secured on the shaft 53.

Means are provided for oscillating the pocket 91 to effect discharge of a fruit therefrom at the proper moment into each of the pocket structures 60 passing thereby. This same movement is utilized to operate the pawl 91 to control movement of the row of fruit in the feed trough 97. As seen in Figures 1 and 6, the sprocket 107 carries an eccentric pin 111 connected by a rod 112 to a rock arm 113 of the shaft 92. As seen in Figure 7, operation of the rock shaft 92 will move the pocket 91 to discharge a fruit into an ascending pocket structure 60. A guide chute 116 (Figures 6 and 7) having opposite inclined side portions is disposed between the frame plates 33 and 34 to assist and direct a fruit into an ascending pocket structure 60.

The pawl 96 (Figures 3 and 5) is pivotally mounted by a pin 117 in a block 118 on the frame casting 94 and is urged by a spring 119 against the hub 101a of the adjacent pulley 101 at its top. The pawl 96 is provided also with a tail 96a which lies under a depending flange 91a of the pocket 91. As seen most clearly in Figure 6, the pawl is split and has two portions lying at either side of the belt 98 and the adjacent pulley 101, the pawl portions being provided with stop ends 96b and with inclined stop rises 96c to be operative with respect to the fruit in different positions. As seen in Figure 5, the stop rises 96c are operative with respect to the fruit to restrain the row of fruit on the belt 98 while the pocket is in dumping position. As the pocket 91 is returned rapidly to its fruit receiving position, its flange 91a engages the tail 96a of the pawl 96 and moves the pawl rapidly from the position shown in Figure 5 to that shown in Figure 3. This places the stop ends 96b of the pawl in operative relation with a fruit and literally throws the fruit resting on the pawl into the pocket structure. This movement of a fruit into the feed pocket 91 is assisted by a curved guide end 121a (Figures 3 and 6) of a side rail 121 of the conveyor.

It is believed that the operation of the fruit feed means will be apparent from the above description, and that the operation will result in the feeding of one fruit from the feed pocket 91 to each of the pocket structures 60 passing thereby.

While I have shown and described a preferred embodiment of the invention, it will be understood that the invention is capable of variation and modification from the form shown, so that its scope should be limited only by the proper scope of the claims appended hereto.

I claim:

1. In a fruit handling mechanism having a conveyor and a series of pocket structures carried by said conveyor for movement along an upright path, a fruit feed pocket mounted adjacent to said upright path for swinging movement about a horizontal axis to and from said path in time with the pocket structures, means for feeding fruit one by one to said feed pocket including a pawl adjacent to said pocket swingable about a horizontal axis that is at a right angle to the axis about which said pocket is swingable, said pawl being adapted to support the body of one fruit only thereon for discharge of such one body therefrom into said pocket upon swinging said pocket away from said path, and means connected with said pawl engageable with said pocket upon said pocket so swinging away from said path for so swinging said pawl.

2. In a fruit handling mechanism having a conveyor and a series of pocket structures carried by said conveyor for movement along an upright path, a fruit feed pocket mounted adjacent to said upright path for swinging movement about a horizontal axis to and from said path in time with the pocket structures, means for feeding fruit one by one to said feed pocket including a pawl adjacent to said pocket swingable about a horizontal axis that is at a right angle to the axis about which said pocket is swingable, said pawl being adapted to support the body of one fruit only thereon for discharge of such one body therefrom into said pocket upon swinging said pocket away from said path, and means connected with said pawl engageable with said pocket upon said pocket so swinging away from said path for so swinging said pawl, means connecting said pocket with said conveyor for swinging said pocket to discharge the fruit thereon into each pocket structure moving therepast along said path, a downwardly inclined carrier extending to said pawl for supporting a row of such fruit thereon for delivery from the lower end of said carrier to said pawl, and stop means on said pawl movable therewith upon movement of said pawl to a position discharging fruit therefrom into said pocket for obstructing movement of fruit on said carrier onto said pawl.

3. In a fruit handling mechanism having a conveyor and a series of pocket structures carried by said conveyor for movement along an upright path, a fruit feed pocket mounted adjacent to said path for swinging movement about a horizontal axis to and from said path in time with the pocket structures to discharge fruit thereon into each such pocket structure moving therepast when said pocket is swung to said path and to receive a fruit thereon upon said pocket swinging away from said path, means connecting said pocket with said conveyor for swinging said pocket from a fruit holding position in which a body of fruit is held thereon to a fruit discharge position in which such fruit is discharged into one of said pocket structures, and a pawl adjacent to said pocket swingable from a fruit supporting position adapted to support a single fruit body only thereon to a fruit delivery position in which such body is delivered therefrom into said pocket, means mounting said pawl for so swinging the latter, and means actuated by movement of said pocket to its fruit holding position for swinging said pawl to its said fruit delivery position, and means for feeding fruit bodies from a row thereof onto said pawl one at a time.

References Cited in the file of this patent

UNITED STATES PATENTS

| | | |
|---|---|---|
| 245,408 | Sheldon | Aug. 9, 1881 |
| 620,820 | Zies | Mar. 7, 1899 |
| 845,152 | Weir | Feb. 26, 1907 |
| 1,333,065 | Douglass | Mar. 9, 1920 |
| 1,463,763 | Lowe | July 31, 1923 |
| 2,081,441 | Willshaw | May 25, 1937 |
| 2,288,621 | Greer | July 7, 1942 |
| 2,572,773 | Slagle | Oct. 23, 1951 |